April 9, 1968     L. J. BONTRAGER     3,377,098

CAMPING TRAILER

Filed Oct. 1, 1965     4 Sheets-Sheet 1

INVENTOR.
LLOYD J. BONTRAGER
BY
M. A. Hobbs
ATTORNEY

April 9, 1968 L. J. BONTRAGER 3,377,098
CAMPING TRAILER

Filed Oct. 1, 1965 4 Sheets-Sheet 3

INVENTOR.
LLOYD J. BONTRAGER
BY *M. A. Hobbs*
ATTORNEY

April 9, 1968  L. J. BONTRAGER  3,377,098
CAMPING TRAILER

Filed Oct. 1, 1965  4 Sheets-Sheet 4

INVENTOR.
LLOYD J. BONTRAGER
BY *M. A. Hobbs*
ATTORNEY

United States Patent Office 3,377,098
Patented Apr. 9, 1968

3,377,098
CAMPING TRAILER
Lloyd J. Bontrager, Goshen, Ind., assignor to Star Tank and Boat Company, Goshen, Ind., a corporation of Indiana
Filed Oct. 1, 1965, Ser. No. 492,158
4 Claims. (Cl. 296—27)

ABSTRACT OF THE DISCLOSURE

An end extension structure for use with camping trailers and the like having a body and a top adapted to seat on and be raised from the body, the end extension including a platform retractable onto the body. A retractable top of relatively rigid construction is supported in its retractable position within the top, and side and end walls connect the retractable top and platform when the two are in their extended position.

---

In recent years, the camping trailer has become popular and is extensively used for family vacations and hunting and fishing trips, these trailers generally consisting of a relatively low, substantially rectangular-shaped bed or body, and a top which is raised and lowered vertically. The sides between the raised top and the upper edge of the body consist of fabric or plastic material or of other flexible or foldable material. Since the body of the trailer is relatively small and crowded for sleeping more than one or two persons, foldable extensions which protrude from the ends or sides of the unfolded trailer are often provided to form one or more beds or portions thereof. The extensions usually consist of a horizontal base or platform, foldable or slidable from and into the body, and a canopy-type structure connected to the base, the top, and the unfolded flexible side walls. While these canopy-type extensions of flexible material can be folded inwardly into the trailer body without difficulty, they are insubstantial and provide little protection to the sleeping occupants, and often do not remain taut under varying weather conditions and adverse camping surroundings. It is therefore one of the principal objects of the present invention to provide a camping trailer of the aforementioned type, in which the extensions are provided with hard tops of metal or other stiff, weather-resistant material, and which can be readily and conveniently slid or unfolded from the top of the trailer to its extended position for use during camping and easily retracted into its folded position in a fully concealed condition for traveling.

Another object of the invention is to provide a camping trailer having extensions at one or both ends in which a base portion of rigid construction slides outwardly from the top of the trailer body, and in which a top portion of rigid construction slides outwardly and downwardly over the base portion to form a substantial roof therefor, and to provide an effective support for flexible side walls attached to both the base and top.

Still another object of the invention is to provide a relatively simple, easily operated hard-top construction for camping trailer extensions which slides into or under the top and seats therein in a compact condition where it requires little otherwise usable space for storage, and which can be easily released and withdrawn therefrom for forming the unfolded extension.

A further object is to provide an extension structure for trailers in which the top slides outwardly and inwardly beneath the trailer top as a unit, and which, aside from the outer end or edge, is sufficiently rigid and strong to be self-supporting and provide effective protection to the occupants of the trailer.

Additional objects and advantages of the invention will become apparent from the following description and accompanying drawings, wherein.

Figure 1:
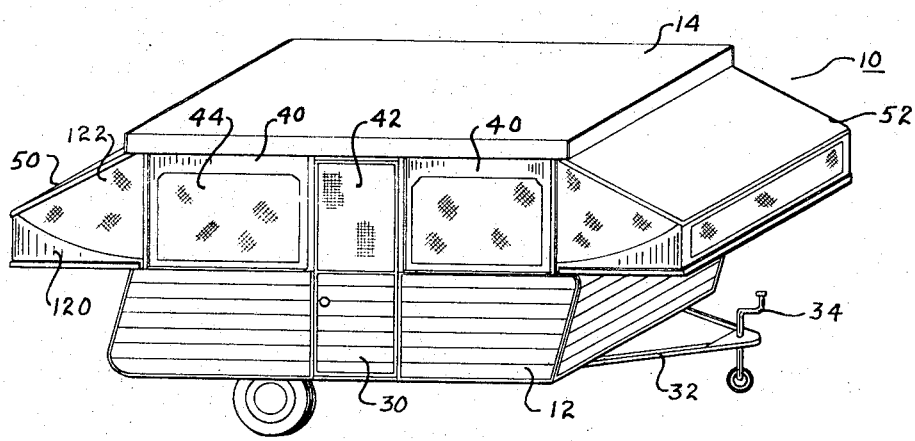
FIGURE 1 is a perspective view of a camping trailer having the present invention incorporated therein, and illustrating the trailer in its unfolded position.
Figure 2:
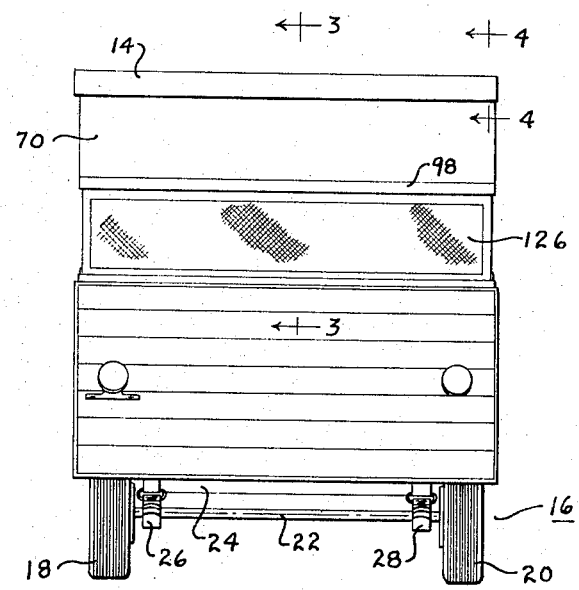
FIGURE 2 is a rear elevational view of the camping trailer shown in FIGURE 1.

Referring more specifically to the drawings, and to FIGURES 1 and 2 in particular, numeral 10 designates generally the present camping trailer having a body 12, top 14, and undercarriage 16, consisting of two wheels 18 and 20 supported on an axle 22, which in turn is connected to frame 24 of the bed by springs 26 and 28. The details of the trailer body, top and undercarriage will not be described in detail herein, since the details thereof are not essential to a complete understanding of the present invention, and the present invention may be embodied in trailers of different designs and construction from those shown in the drawings.

The trailer body is relatively low and rectangular in shape, the one shown in the drawings having a door 30 along one side thereof, and a forwardly projecting frame section 32 for connection to a towing vehicle. The body is retained in substantially level condition when the trailer is parked by a lift 34 mounted on the forward end of frame extension 32. When the trailer is in the condition for traveling, top 14 rests on the upper edge of body 12, and when the trailer is expanded for camping the top is held in its raised or elevated position by posts 36 at the four corners of the trailer. Various types of posts or supporting structures can be used, either the foldable or extensible types being suitable for this purpose as long as the top is maintained in a relatively rigid condition directly above the body. The space between top 14 in its raised position and the upper edge of body 12 is preferably closed by flexible panels 40 on the sides, and panel 42 disposed above and forming a part of door 30. The flexible material is preferably plastic or fabric, containing windows 44 which fold and flex along with the remainder of the side panels.

The present invention is primarily concerned with the construction and operation of extensions 50 and 52 at the rear and forward ends of the trailer, and since the construction of these two extensions is the same, only one will be described in detail herein. Extension 50 consists of a flat base or platform 54 of rigid construction supported at its two sides by track structures 56 and 58. Each track structure consists of a rigid bar 60 on which a roller 62 is rotatably attached, the roller extending into track section 64, which is rigidly mounted along the internal upper edge of the sides of body 12. The platform 54 can be slid inwardly and outwardly as rollers 62 roll along tracks 64, thereby giving substantial support to the inner end of platform 54, and retaining it in position, both while in the retracted and extended positions. A mattress 65 is preferably placed on platform 54 to form a suitable bed or lounge structure.

The hard-top 70 of the two extensions 50 and 52 slides into top 14 and is completely enclosed therein when the top 70 is in its retracted position. The inner end of top 70 is supported by tracks 72 and 74 secured to the inner sides 76 and 78 of the top 14. The tracks are connected to the opposite sides of top 70 by rollers 80 and 81 on bars 82 and 83, respectively. When top 70 is in its extended position, the outer end of the top is supported by a generally U-shaped frame 84 having side members 86 and 88 connected to one another at their upper ends by a horizontal member 90 and pivoted at their lower ends to the sides of platform 54 by pins or bolts 92 and 94. Member 90 and the upper ends of members 86 and 88 seat in the outer end 96 of top 70 and are retained therein by end flange 98, the end flange being connected to side flanges 100 and 102 of the top. These two side flanges, together with strengthening ribs 104, 106 and 108, give substantial reinforcement to panel 110 of the top, the panel preferably being of metal or other relatively rigid and water-proof material. When top 70 is in in its retracted position, it is held firmly therein by tracks 72 and 74 and by a clip 112, secured to end 114 of trailer top 14 and having a shoulder 116 which supports the outer end 96 when top 70 is fully retracted within top 14.

The sides 120 of the extensions consist of flexible material, preferably having a flexible window 122 therein, the sides being connected to the respective side panels 40 by zippers 124 which, when unzipped, permit platform 54 to slide inwardly over body 12 without interference from either side 120 or panels 40. The two sides 120 are connected to one another by an end panel 126 which completes the enclosure for the extension. The upper edge of the side walls 120 and end wall 126 are preferably secured to the edges of flanges 98, 100 and 102, and are releasably held beneath platform 54 by a tie cord or other suitable releasable securing means.

When the trailer is in its folded condition, the top 70 is in its retracted position with the inner end supported by rollers 80 and 81 in tracks 72 and 74, the outer end being supported by spring-clip 112. With top 70 fully retracted in top 14, the latter top can seat effectively on body 12 to form a weather-tight joint between the body and top. When the top is lowered onto body 12, platform 54 is in its retracted position inwardly along tracks 56 and 58, completely within the confines of the sides of body 12, and the sides of top 14 seat downwardly over the platform, completely enclosing it within the folded trailer.

Figure 3:
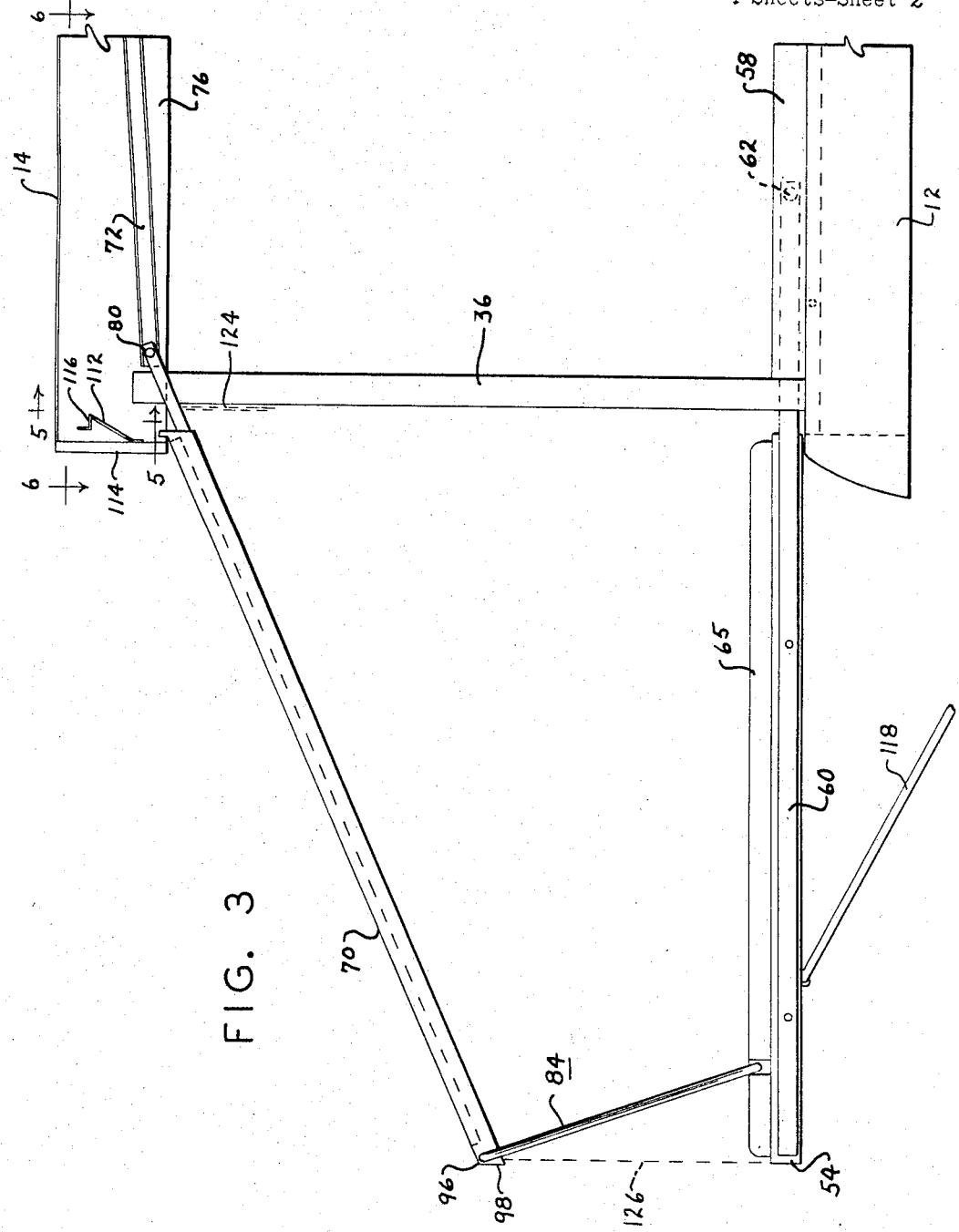
FIGURE 3 is a fragmentary vertical cross sectional view of the present trailer showing it in its unfolded position, the section being taken on line 3—3 of FIGURE 2.
Figure 4:
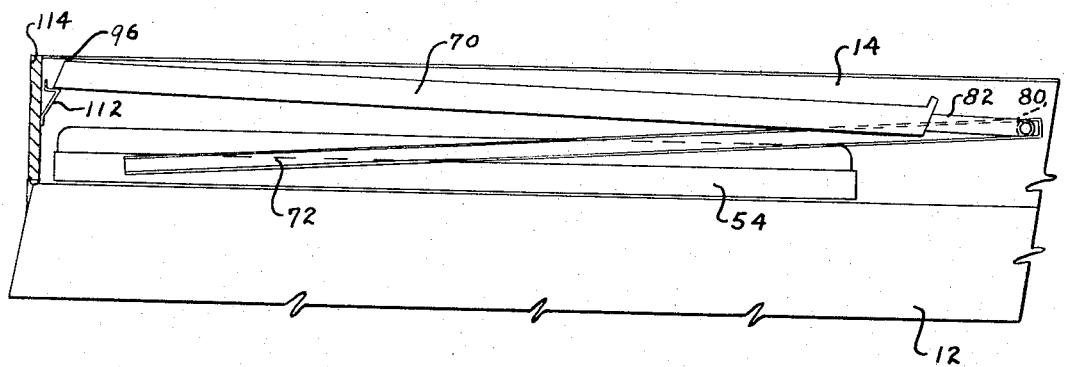
FIGURE 4 is a fragmentary cross sectional view of the trailer shown in the preceding figures, showing the extensible top of one of the extensions in its retracted position in the top of the trailer, and the trailer in folded position, the view showing the parts after the adjacent side of the top has been removed, along a line corresponding to section 4—4 of FIGURE 2.
Figure 5:
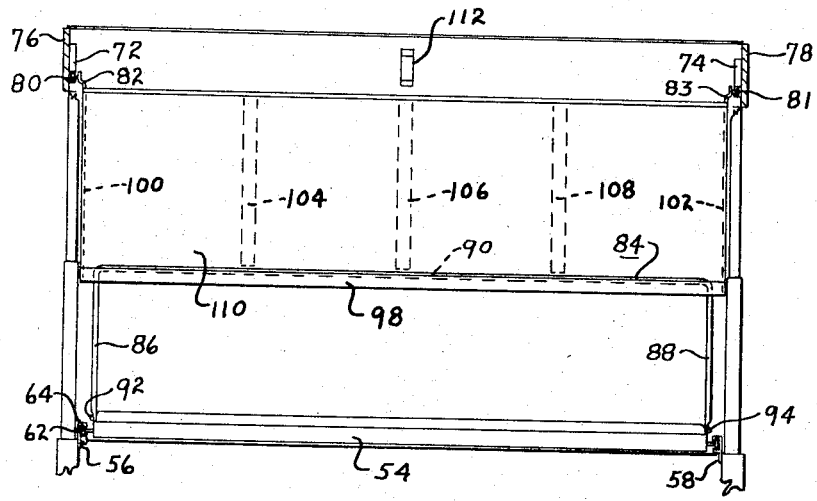
FIGURE 5 is an elevational and partial cross sectional view of a portion of the end of one of the extensions shown in the preceding figures, the section being taken on line 5—5 of FIGURE 3.
Figure 6:
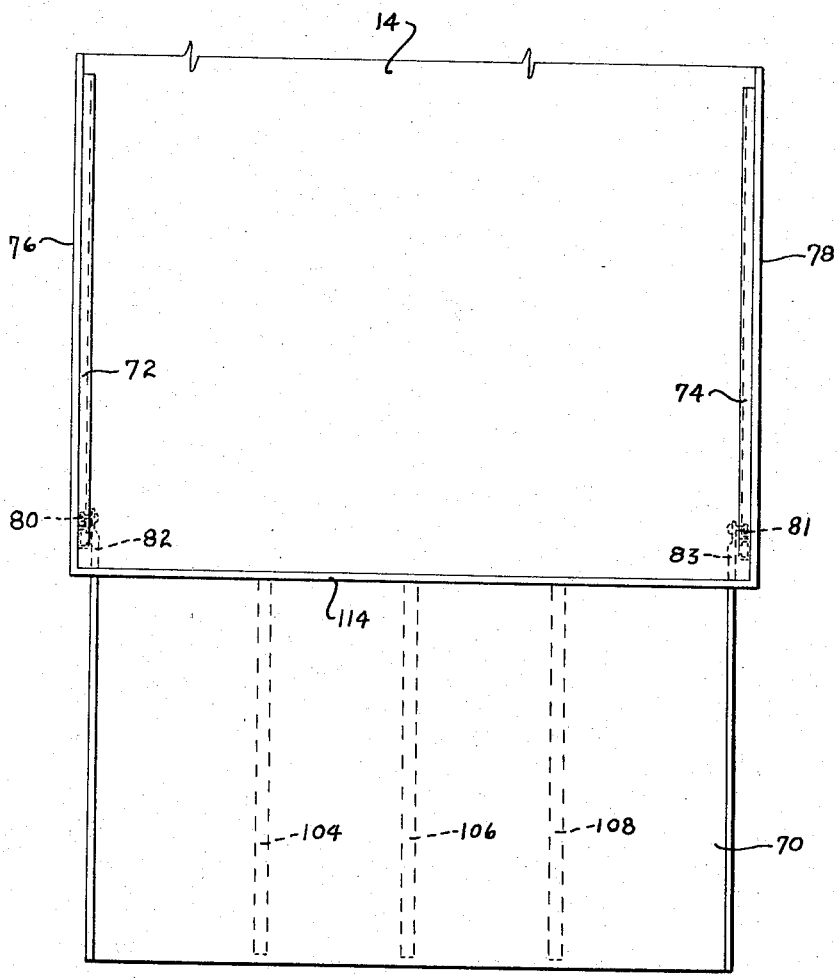
FIGURE 6 is a fragmentary top plan partial horizontal cross sectional view of the trailer construction relative to the extension structure, the section being taken on line 6—6 of FIGURE 3.

When the trailer is to be used at a camping site, it is expanded by first raising top 14 to its fully elevated position, as shown in FIGURES 1, 2 and 3, the top being rigidly supported in elevated position by the four posts 36. Platform 54 is then slid outwardly to the position shown in FIGURE 3 and is preferably supported at its outer end by a pair of rods 118 connected at their upper end to the underside of platform 54 and supported at their lower ends in a fixture on the lower end of the trailer body. The top is then slid outwardly to the position shown in FIGURE 3 where it is rigidly supported in this extended position by frame 84. With the top 70 and platform 54 in the position illustrated in FIGURE 3, the two sides 120 and end 126 are in position to be secured in place. The lower edge of the two sides and end are placed beneath the platform, and the inner edges of the two sides are secured by zippers to the respective panels 40. The extension is now completely assembled and ready for use, and the rigid or hard-top construction of top 70 gives substantial protection to the occupants from falling tree limbs, hail and other falling objects.

While only one embodiment of the present trailer construction has been described in detail herein, various changes and modifications may be made without departing from the scope of the invention.

I claim:

1. In a camping trailer having a generally rectangularly-shaped body, a top for the body of relatively flat configuration with side and end walls, means for raising and lowering the top and flexible side walls between said body and top: an extension at one end of said body, comprising a retractable platform, track means for sliding said platform into the confines of the body side walls, a means for supporting the outer end of said platform when in its extended position, a top for said extension having a panel of relatively rigid construction, a track along the inner side walls of said trailer top, roller means mounted on said extension top near the inner corners thereof for supporting the inner end of said extension top in said track means in both its retracted and extended positions, a fixture mounted in said trailer top for releasably retaining the outer end of said extension top in place in the trailer top, a support member pivotally connected to said platform and engaging said extension top for supporting the outer end thereof, and side walls of flexible material secured to said extension top and releasably secured to said platform and to the respective flexible side wall between the body and trailer top.

2. In a camping trailer having a body, a top for the body of relatively flat configuration with side and end walls, means for raising and lowering the top, and flexible side walls between said body and top: an extension comprising a platform track means for sliding said platform to a position over said body, a top for said extension having a panel of relatively rigid construction, a track along the inner side walls of said trailer top, roller means mounted on said extension top near the inner corners thereof for supporting the inner end of said extension top in said track means in both its retracted and extended positions, a fixture mounted in said trailer top for releasably retaining the outer end of said extension top in place in the trailer top, a support member connected to said platform and engaging said extension top for supporting the outer end of said extension top, and side walls of flexible material secured to said extension top and releasably secured to said platform and to the respective flexible side wall between the body and trailer top.

3. In a trailer having a body, a top for the body of relatively flat configuration with side and end walls, means for raising and lowering the top, and side walls between said body and top: an extension comprising a platform, track means for sliding said platform to a position over the body, a top for said extension having a relatively rigid panel, a track along the inner side walls of said trailer top, roller means mounted on said extension top near the inner corners thereof for supporting the inner end of said extension top in said track means in both its retracted and extended positions, a fixture mounted in said trailer top for releasably retaining the outer end of said extension top in place in the trailer top, a member for supporting the outer end of said extension top when said top is in its extended position, and side walls of flexible material secured to said extension top and releasably secured to said platform and to the respective flexible side wall between the body and trailer top.

4. In a trailer having a body, a top for the body of relatively flat configuration with side and end walls, and means for raising and lowering the top: an extension comprising a retractable platform at each end of said body mounted at the upper edge thereof, a top for said extension having a panel of relatively rigid construction and being movable with said top when the top is lowered and raised to and from a position directly over said retracted platform, a track along the inner side walls of said trailer top, means mounted on said extension top near the inner corners thereof for supporting the inner end of said extension top in said track in both its retracted and extended positions, a fixture mounted in said trailer top for releasably retaining the outer end of said extension top in place in the trailer top, a member for supporting the outer end of said extension top when said top is in its extended position, and side walls of flexible material secured to said extension top and releasably secured to said platform.

References Cited

UNITED STATES PATENTS

| | | | |
|---|---|---|---|
| 1,964,894 | 7/1934 | Rhone | 296—26 |
| 1,972,415 | 9/1934 | Anderson | 296—26 |
| 2,640,721 | 6/1953 | Kors | 296—23.2 |

LEO FRIAGLIA, *Primary Examiner.*

PHILIP GOODMAN, *Examiner.*